United States Patent
Parker et al.

(10) Patent No.: US 7,046,269 B2
(45) Date of Patent: May 16, 2006

(54) SHARING OF PRERECORDED MOTION VIDEO OVER AN INTERNETWORK

(75) Inventors: Benjamin J. Parker, Overland Park, KS (US); Shane R. Werner, Olathe, KS (US); Charles Diaz, Overland Park, KS (US); Terry M. Frederick, Lenexa, KS (US); Terry T. Yu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 562 days.

(21) Appl. No.: 10/058,882

(22) Filed: Jan. 28, 2002

(65) Prior Publication Data

US 2004/0246951 A1  Dec. 9, 2004

Related U.S. Application Data

(63) Continuation-in-part of application No. 10/033,813, filed on Dec. 20, 2001, which is a continuation-in-part of application No. 09/978,616, filed on Oct. 16, 2001, now Pat. No. 6,545,697.

(51) Int. Cl.
*H04N 7/14* (2006.01)

(52) U.S. Cl. .............................. 348/14.08; 348/14.01; 348/14.09

(58) Field of Classification Search .. 348/14.01–14.09; 709/204, 245, 203, 217, 223, 227, 231, 248, 709/205; 345/751, 753; 725/88, 90
See application file for complete search history.

(56) References Cited

U.S. PATENT DOCUMENTS

| | | | |
|---|---|---|---|
| 5,689,553 A | | 11/1997 | Ahuja et al. |
| 5,742,670 A | * | 4/1998 | Bennett ................. 379/142.04 |
| 5,764,916 A | | 6/1998 | Busey et al. |
| 5,949,763 A | | 9/1999 | Lund |
| 6,097,793 A | | 8/2000 | Jändel |
| 6,337,858 B1 | | 1/2002 | Petty et al. |
| 6,343,313 B1 | * | 1/2002 | Salesky et al. ............. 709/204 |
| 6,370,137 B1 | | 4/2002 | Lund |
| 6,539,077 B1 | | 3/2003 | Ranalli et al. |
| 6,704,294 B1 | | 3/2004 | Cruickshank |
| 6,728,753 B1 | * | 4/2004 | Parasnis et al. ............. 709/203 |

FOREIGN PATENT DOCUMENTS

| | | |
|---|---|---|
| EP | 0574138 A1 * | 12/1993 |
| EP | 0 721266 | 7/1996 |
| EP | 0 999712 | 5/2000 |
| EP | 1 059 798 | 12/2000 |
| GB | 2357659 | 6/2001 |
| WO | WO 01/71994 | 9/2001 |

* cited by examiner

*Primary Examiner*—Melur Ramakrishnaiah

(57) ABSTRACT

A data call between at least two internetworked computers is established using a central server. Once the data call is in place, prerecorded motion video is shared between the two computers by creating a streaming video server on one user's computer for streaming the prerecorded motion video simultaneously to both users as clients of the streaming server. Either user can pause, rewind, or fast forward the streamed video as it is viewed by both users.

9 Claims, 9 Drawing Sheets

SHARING OF PRERECORDED MOTION VIDEO OVER AN INTERNETWORK

CROSS REFERENCE TO RELATED APPLICATIONS

The present application is a continuation-in-part of pending U.S. application Ser. No. 10/033,813, filed Dec. 20, 2001, entitled "Telephonic Addressing For Establishing Simultaneous Voice and Computer Network Connections", which is a continuation-in-part of prior U.S. application Ser. No. 09/978,616, filed Oct. 16, 2001, now U.S. Pat. No. 6,545,697 entitled "Video Telephony". This application is further related to co-pending U.S. applications Ser. No. 10/058,549, entitled "Private Sharing of Computer Resources Over an Internetwork"; U.S. application Ser. No. 10/058,517, entitled "Obtaining On-Demand Goods and Services Using Video Telephony," now U.S. Pat. No. 6,690,407, issued Feb. 10, 2004; and U.S. application Ser. No. 10/058,886, entitled "Coordination of Video Sessions When Calling an Auto-Attendant System," now U.S. Pat. No. 6,693,662, issued Feb. 17, 2004, all incorporated herein by reference.

STATEMENT REGARDING FEDERALLY SPONSORED RESEARCH

Not Applicable.

BACKGROUND OF THE INVENTION

1. Field of the Invention

The present invention relates to establishing a communication session between users connected to a computer network in order to share prerecorded video privately between the users. The prerecorded video may typically comprise video and audio data recorded using a portable, digital video camera to be shared with family or friends over the Internet.

Internetworking (i.e., the interconnection of many computer networks) allows the interaction of very large numbers of computers and computer users. The most well known example is the Internet. Computers connected to the Internet may be widely separated geographically and utilize many different hardware and software configurations. In order to achieve communication-sessions between any two end-points on the Internet, an addressing system and various standard protocols for exchanging computer data packets have been developed.

2. Description of the Related Art

Each packet sent over the Internet includes fields that specify the source and destination address of the packet according to Internet Protocol (IP) addresses assigned to the network interface nodes involved. Currently assigned addresses comprise 32 bits, although future standards allow for 128 bit addresses. The 32 bit addresses are normally written by breaking the 32 bits into 4 groups of 8 bits each and writing the decimal equivalents of each group separated by periods (e.g., 208.25.106.10).

Since numerical IP addresses are inconvenient to use and remember, a protocol for assigning and accessing logical names is used known as the domain name system (DNS). DNS servers are deployed within the Internet which perform a translation function between a logical domain name such as "sprint.com" and its numerical equivalent "1208.25.106.10". After receiving an IP address back from a DNS server, a computer can forward data packets to the IP address and establish a connection or session with the remote computer.

While the DNS system works well for hosted content (e.g., material made available for browsing by commercial and private entities), it is not well suited to ad hoc communications or exchanges of data between individuals. Hosting a website and registering an IP address within the DNS system is expensive and time consuming. Furthermore, due to an impending shortage of IP addresses and the cost for maintaining use of each IP address, many Internet service providers assign IP addresses dynamically to their individual users. In other words, when a user signs on to their service, they are temporarily assigned an IP address from an address pool assigned to their service provider. The user occupies that IP address only for their current session.

Even when individual users have their own static IP addresses, and when other users can remember the IP address of a user with whom they would like to establish a connection session over the Internet (e.g., for voice or video telephony), the need to configure their hardware or software is too complex for many users. This is one reason why e-mail is such a popular and successful Internet application. A mail server with an easy to remember domain name acts as intermediary between two individual users. Using a simple application program and the recipient's account name on the mail server (i.e., their e-mail address), text messages and computer files can be exchanged. The exchange, however, does not allow the users to interact in real time. Thus, there is a need for a way to allow two or more individual users to establish interactive connection sessions over the Internet without requiring overt knowledge of the other's IP address and without complicated configurations or set-ups.

Copending applications U.S. Ser. No. 09/978,616 and U.S. Ser. No. 10/033,813 teach the use of a central server allowing two or more individual users to establish interactive connection sessions over the Internet without requiring overt knowledge of the other's IP address and without complicated configurations or set-ups. Each user registers with the central server, resulting in a database of users and their current IP addresses. A calling user sends a request to the central server to establish a connection with a called user. The central server can either relay all network message packets between the users for the duration of a "call", or it may provide the IP addresses to the users so that they can exchange packets directly. The called user may be identified within the database by information well known or easily discovered by other users, such as their telephone number. A telephone call may be established simultaneously with establishing the computer network session, thereby enhancing the user interaction regardless of the type of computer data to be exchanged (e.g., video frames, computer files, etc.). In one embodiment, the computer network session is automatically established in response to the act of dialing the called user's telephone number.

The functions of identifying the called telephone number, forwarding a call request to the central server, and conducting a packet exchange during a data call are performed by a specific software application program referred to herein as a call client. A particular call client may include provision for exchanging certain types of data for preselected purposes and according to predefined protocols. Sharing other types of data or other types of computer resources between the users may exceed the capabilities of any particular call client. Thus, it would be desirable to share such computer resources independently of the call client.

Copending U.S. application Ser. No. 10/058,549 discloses the creation of a virtual server on one user's computer for serving shared information simultaneously to both users as clients of the virtual server.

SUMMARY OF THE INVENTION

The present invention provides the ability to share prerecorded motion video (e.g., video and audio data from a digital camcorder) uploaded to one user's computer by streaming compressed data from a streaming video server simultaneously to both users as clients of the video server.

In one aspect of the invention, a method is provided for privately sharing prerecorded motion video between first and second computers connected to an internetwork for exchanging network packets therebetween. Each of the computers has a respective private IP address within the internetwork. A central server coupled to the internetwork contains a database of IP addresses of registered computers. Call clients run (i.e., are executed) in each of the first and second computers for establishing a data call between the first and second computers in response to the database of IP addresses. The prerecorded motion video is uploaded into a video server application in the first computer, wherein the video server application supports streaming media. A request for sharing the prerecorded motion video is generated within the first or second computers. Media player applications run in the first and second computers, wherein the media player applications support streaming media. The uploaded motion video is streamed from the video server application to the media player applications simultaneously. The prerecorded motion video is displayed on the first and second computers.

DETAILED DESCRIPTION OF PREFERRED EMBODIMENTS

Figure 1:
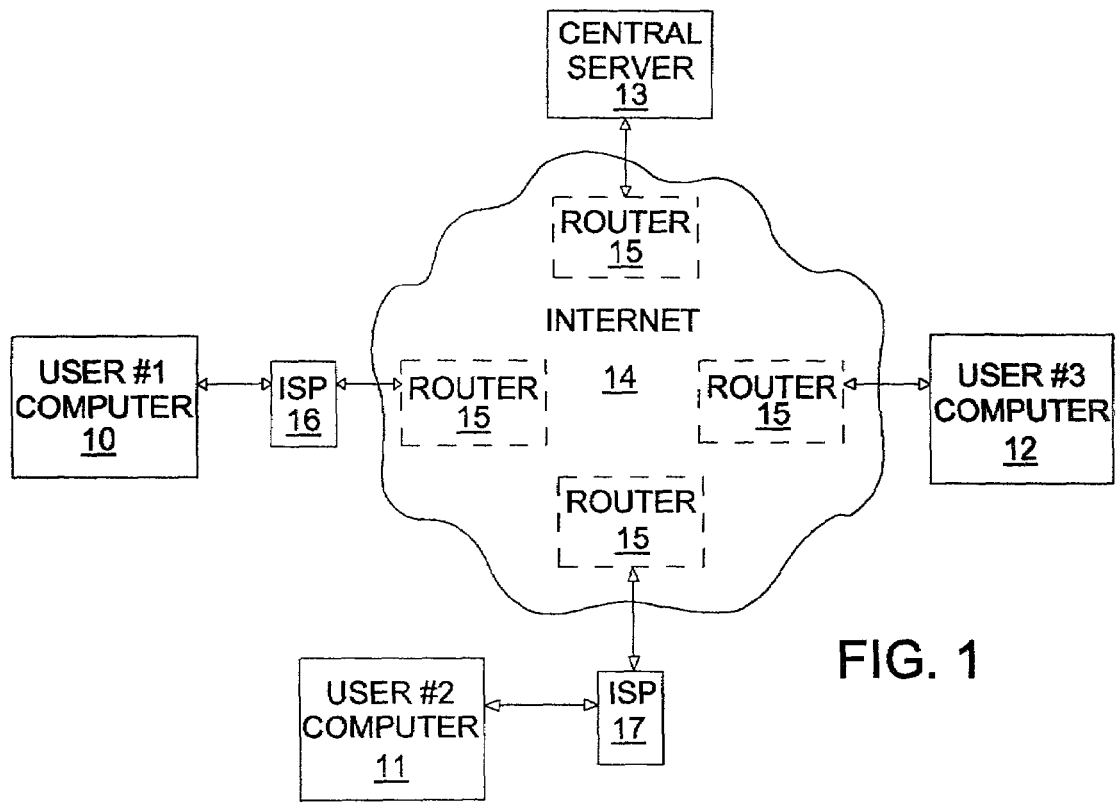
FIG. 1 is a block diagram showing the interconnection of users over the Internet to the central server of the present invention.

Referring to FIG. 1, a plurality of user computers 10, 11, and 12, and a central server 13 are internetworked via the Internet 14. A plurality of routers 15 within Internet 14 direct packets between various endpoints or nodes. Computers 10 and 11 are shown as being connected to Internet routers belonging to Internet Service Providers (ISP's) 16 and 17, respectively. The connections to the ISP's may be by dial-up, digital subscriber line (DSL), cable modem, or integrated access device (IAD), for example. Central server 13 and computer 12 are shown directly connected to a router.

Network communication comprises data messages or packets transferred between separate endpoints, such as between computers 10, 11, or 12 (as clients) and central server 13. The packet transfer is accomplished by routers 15 using the IP addresses contained in each packet. Central server 13 typically has a fixed IP address that is listed on the DNS servers accessible to each computer. Each computer user can easily communicate with central server 13 by supplying its logical name (e.g., www.sprint.exchange.com) which is automatically resolved by their browser into an IP address by consulting a DNS server. Exchanging packets between users 10, 11, and 12 themselves cannot usually be accomplished in the same way because the users and their IP addresses are not listed in the DNS system. Furthermore, users 10, 11, and 12 may not wish to allow remote access into their computers except in certain circumstances.

Figure 2:
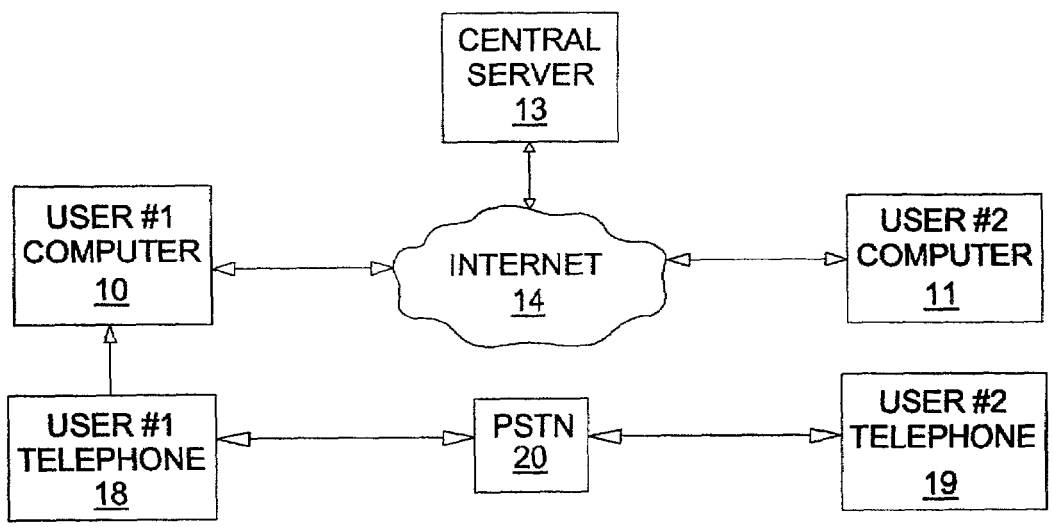
FIG. 2 is a block diagram showing a user connection model of the present invention.

The present invention facilitates exchanging data messages between two individual users by providing a specialized directory or look-up within central sever 13. As shown in FIG. 2, the present invention may be used within a system that functions to simultaneously establish a voice telephone call between the two individual computer users. In certain embodiments, the voice call serves as the user action that initiates the computer processing to establish the computer-to-computer connection. In addition, the voice call provides a way to alert the called party of the request to establish the computer connection and then serves to enhance the interaction between the two users during the exchange of computer data. However, the present invention also provides other methods for initiating the computer processing, and a simultaneous voice telephone call is not necessary in the present invention.

Regarding the embodiment with a simultaneous voice telephone call in FIG. 2, computers 10 and 11 have associated telephones 18 and 19 used by the same respective users. The computers and telephones may be fixed installations (e.g., in a residence or a business office) or may be mobile devices (e.g., laptop computer and cellular phone), as long as both are accessible to each user at the same time. The telephones are connected to the public switched telephone network (PSTN) 20. Central server 13 provides a user look-up and interconnecting service for registered users. For security and/or billing purposes, access to the service preferably is tied to user ID's and passwords. A user may be given an ID and password with initial sign-up for the service. Each user would manually configure the telephone number that they want to be associated with. When the user is "on-line" (i.e., has their computer turned on and connected to Internet 14), their computer sends a registration message to central server 13 to notify it that the user is available. Central server 13 can inspect the registration message to determine the current IP address and port number at which the user resides for its current connection session. Alternatively, the user may manually configure their IP address in some circumstances. Upon registration, central server 13 may preferably determine whether the user has a respective firewall as described in copending U.S. application serial no. (1805). In any case, central server 13 contains a database of currently active, registered users. Each user entry in the database includes fields for user ID, password, telephone number, and IP address (including port number), user status, and a firewall flag, for example.

In the connection model of FIG. 2, a user #1 dials telephone 18 to make a voice call to a user #2 at telephone 19. The telephone number dialed by user #1 is captured as a target telephone identifier number and sent to a call client (i.e., an application program for managing the data call) in computer 10 being used by user #1. Computer 10 forwards the target telephone number to central server 13 as part of an access request for establishing a connection with user #2. Central server 13 looks up the target number in its database. When it finds the target number, central server 13 identifies the IP address associated with user #2 and sends an initiation message to computer 11 being used by user #2. When computer 11 receives the initiation message, it launches its own call client. The initiation message may identify user #1 (preferably by both telephone number and user ID) and the type of data to be exchanged (i.e., the application program or how the call client should be configured to receive the data). User #2 answers the telephone voice call and learns that an initiation message was sent to their computer. Using computer 11, user #2 can verify the calling party as user #1 and can indicate whether they accept the computer network connection (i.e., the data call) with user #1. Once user #2 accepts, data messages can be exchanged between the call client application programs running on computers 10 and 11. The call client application programs can be written to perform file transfers of various types of files, video data or frames for video telephony, or other real-time data or control signals. It may also be desired by a user to share computer data or other computer resources besides the data or file types that have been programmed into the call clients, as described below.

Figure 3:
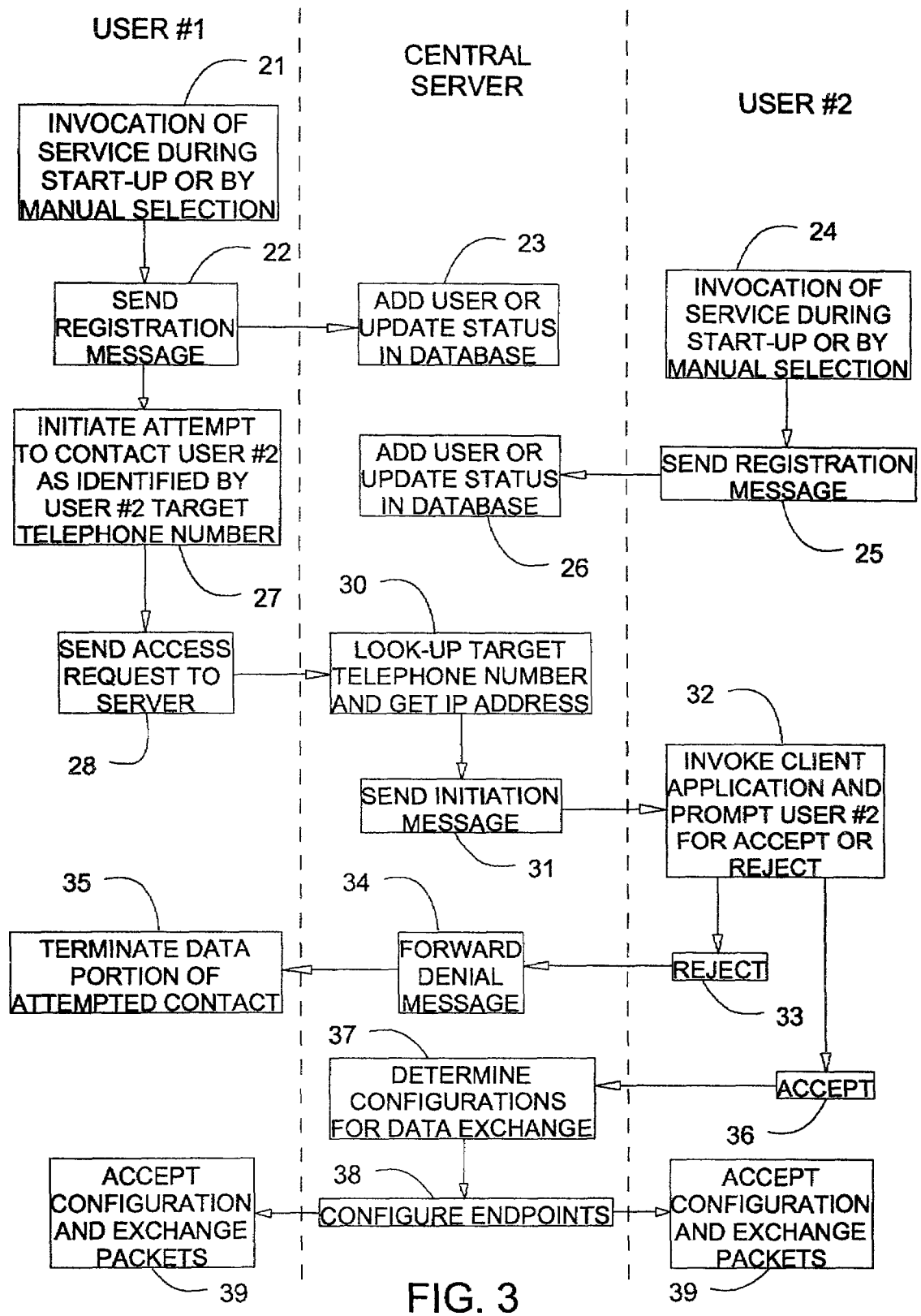
FIG. 3 is a flow diagram of the establishment of a data call used in the present invention.

The sequence of events occurring to establish a data call is shown in greater detail in FIG. 3, in which user #1 events are in the left column, central server events in the center column, and user #2 events in the right column. In step 21, user #1 invokes the real-time interconnection service of the present invention. This can be configured as part of the normal start-up of their computer or can result from manually launching a software application such as the call client after start-up has finished. When the service is invoked by user #1, a registration message is sent to the central server in step 22. The registration message preferably includes the user ID and password assigned to user #1. In addition, the application software that creates the registration message may also determine the local IP address being used by the computer and includes this as data within the registration message. The registration message would typically also include the telephone number being used by user #1. In addition to the IP address being explicitly added to the message by the application program for user #1, the IP address (and port number) is typically embedded in each packet forwarded by the network and the central server preferably extracts the automatically embedded IP address and port number. In step 23, the central server receives the registration message and adds the new user to the database or updates the user status, as necessary.

Separately, user #2 invokes the real-time interconnection service in step 24. User #2 sends a registration message in step 25, and the central server receives the registration message and adds user #2 to the database or updates the user status, as necessary. Thereafter, the central server may periodically exchange further messages with each registered user to keep the user status current and to maintain an open session with each user, for example. When a user shuts down their application program or their computer, an unregister message (not shown) may also be sent to the central server.

During the time that user #1 is on-line, user #1 desires to exchange computer data with user #2. In step 27, user #1 initiates an attempt to contact user #2 and set up the data exchange. In a preferred embodiment, user #1 may identify user #2 by virtue of user #2's telephone number. This target telephone number may preferably be captured from the act of dialing it on user #1's telephone equipment. According to one example, a dedicated module may be connected to user #1's telephone to detect the DTMF tones while dialing and to send the dialed number to user #1's computer. The target telephone number for user #2 is included in an access request message sent to the central server in step 28.

In step 30, the central server looks up the target telephone number and gets the IP address (and port number) associated with user #2. The initiation message is sent by the central server in step 31.

User #2 receives the initiation message in step 32. If not already running, the user #2 computer launches the appropriate call client application for responding to the initiation message and then prompts user #2 to either accept or reject the access request. If rejected, then user #2 generates a reject message in step 33 and sends it to the central server. In step 34, the central server forwards the reject message to user #1, which then terminates the data portion of the attempted communication session in step 35 (the voice telephone call is accepted, rejected, or terminated separately).

If user #2 accepts the attempted contact and the request for data exchange, then user #2 causes their computer to generate an accept message in step 36 (e.g., by clicking an "accept" button in an application interface of the call client) and sends it to the central server. In step 37, the central server determines any needed configurations for accomplishing the data exchange and then configures the user #1 and user #2 endpoints in step 38. The two main configurations for the data exchange will be described in connection with FIGS. 4 and 5 and are selected on the basis of detected firewalls, for example. The user #1 and user #2 computers accept the configuration and then begin to exchange the data messages or packets in step 39. Other configuration issues, such as the configuration of the client application programs exchanging the actual data messages can be handled within the access request message, the initiation message, the accept message, and/or other packets exchanged between the endpoints, for example.

Figure 4:
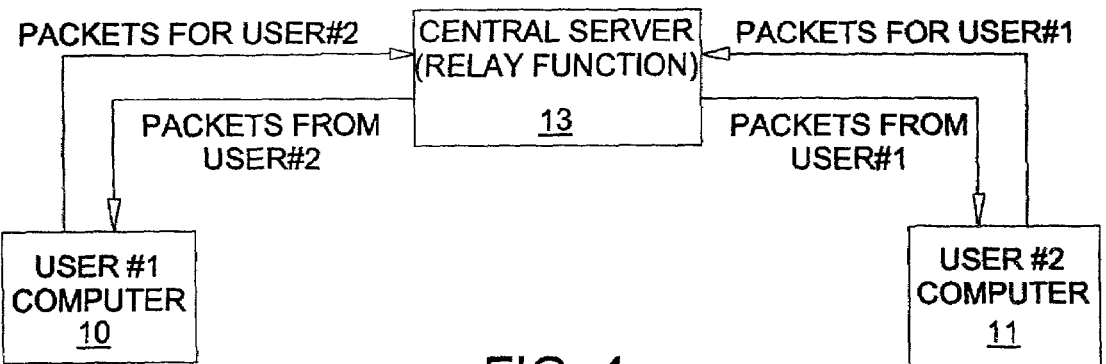
FIG. 4 is a block diagram showing a first embodiment of packet flow for a data call.

A first packet exchange configuration is shown in FIG. 4 wherein central server 13 performs a relay function such that all packets exchanged between computer 10 and computer 11 pass through central server 13. In other words, after a desired user (called party) accepts the data call and central server notifies the first user (calling party) of the acceptance, both endpoints continue to address their sent packets to central server 13. At central server 13, each packet is redirected by substitution of IP addresses. For example, a packet sent from computer 10 including its Own IP address as the source address of the packet and the IP address of central server 13 as the destination address of the packet is modified after being received by central server 13 to have the central server's address as its source address and to have the IP address of computer 11 as its destination address.

After modification, central server 13 sends the packet back to its router and on to computer 11. The same operations are used to send packets from computer 11 to computer 10. The embodiment of FIG. 4 has the advantage that greater privacy of a user's IP address is maintained since each user's computer only needs to see the IP address of central server 13. Furthermore, this configuration can readily function in the presence of network address translation (NAT) firewalls at the endpoints.

Figure 5:
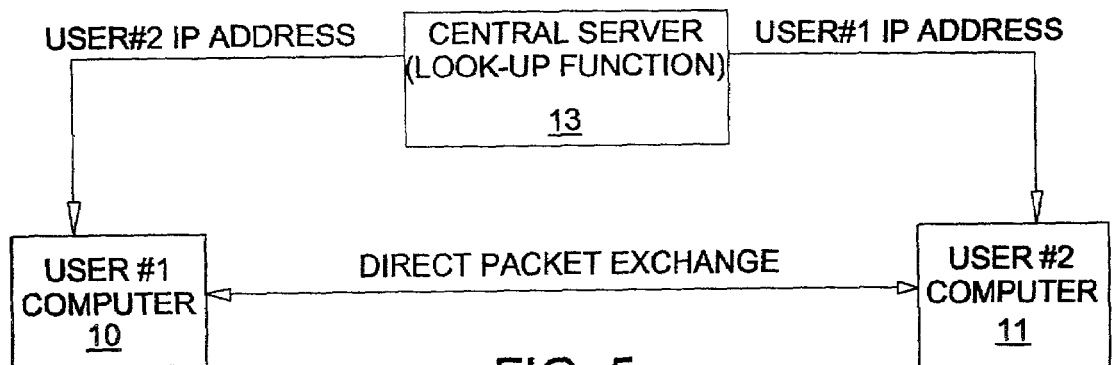
FIG. 5 is a block diagram showing a second embodiment of packet flow for a data call.

FIG. 5 shows an alternative configuration in which direct packet exchange between computers 10 and 11 is realized. Central server 13 provides a look-up function and a connection initiation function. If desired user #2 (called party) accepts a data call, then central server 13 provides the IP address of computer 11 to computer 10 and provides the IP address of computer 10 to computer 11. Thereafter, each computer can send packets addressed to the other computer and the packets are no longer relayed through central server 13. This embodiment has the advantage that central server 13 may be reduced in size since less traffic flows through it.

Figure 6:
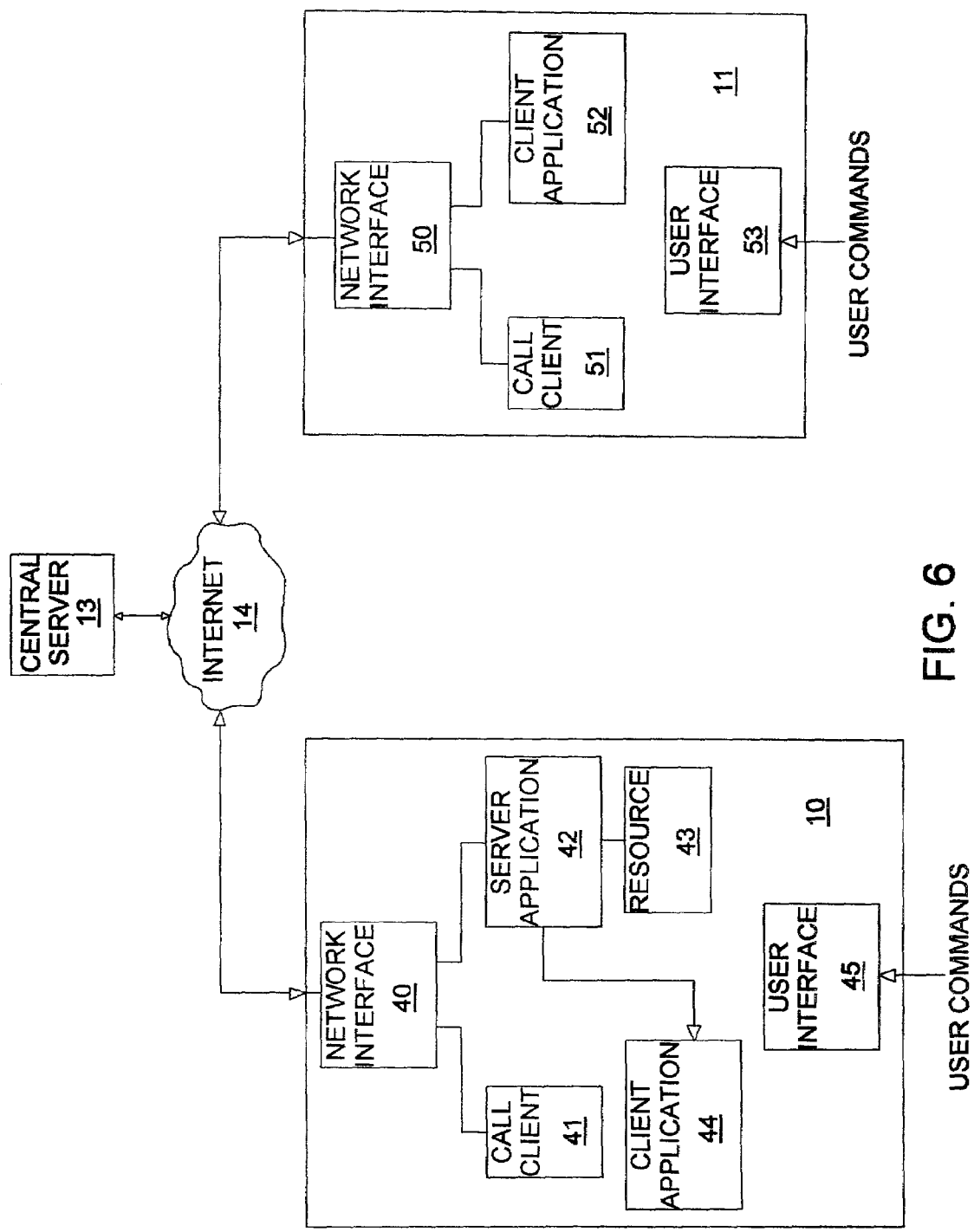
FIG. 6 is a block diagram showing the elements within each computer for accomplishing the sharing of resources between the computers.

The use of either connection method of FIG. 4 or FIG. 5 is transparent to the users. Once either type of data call is established and the call clients are exchanging data messages over the internetwork, the sharing of computer resources is expanded beyond the functionality of the call clients as shown in FIG. 6.

Computer 10 includes a network interface 40 and a call client 41 performing the functions already described. Computer 10 runs a server application 42 for hosting a shared resource 43 such as a particular audio or video media, html pages, or a database, for example. In addition, computer 10 runs a client application 44 which is designed to access or otherwise interact with or display shared resource 43. A user interface 45 may, for example, include operating system software and input/output devices (e.g., monitor, mouse, and keyboard) by which a user interacts with (e.g., provides user commands to) call client 41, server application 42, and client application 44.

Similarly, computer 11 includes a network interface 50, a call client 51, a client application 52, and a user interface 53 for remotely accessing shared resource 43 via Internet 14.

Figure 7:
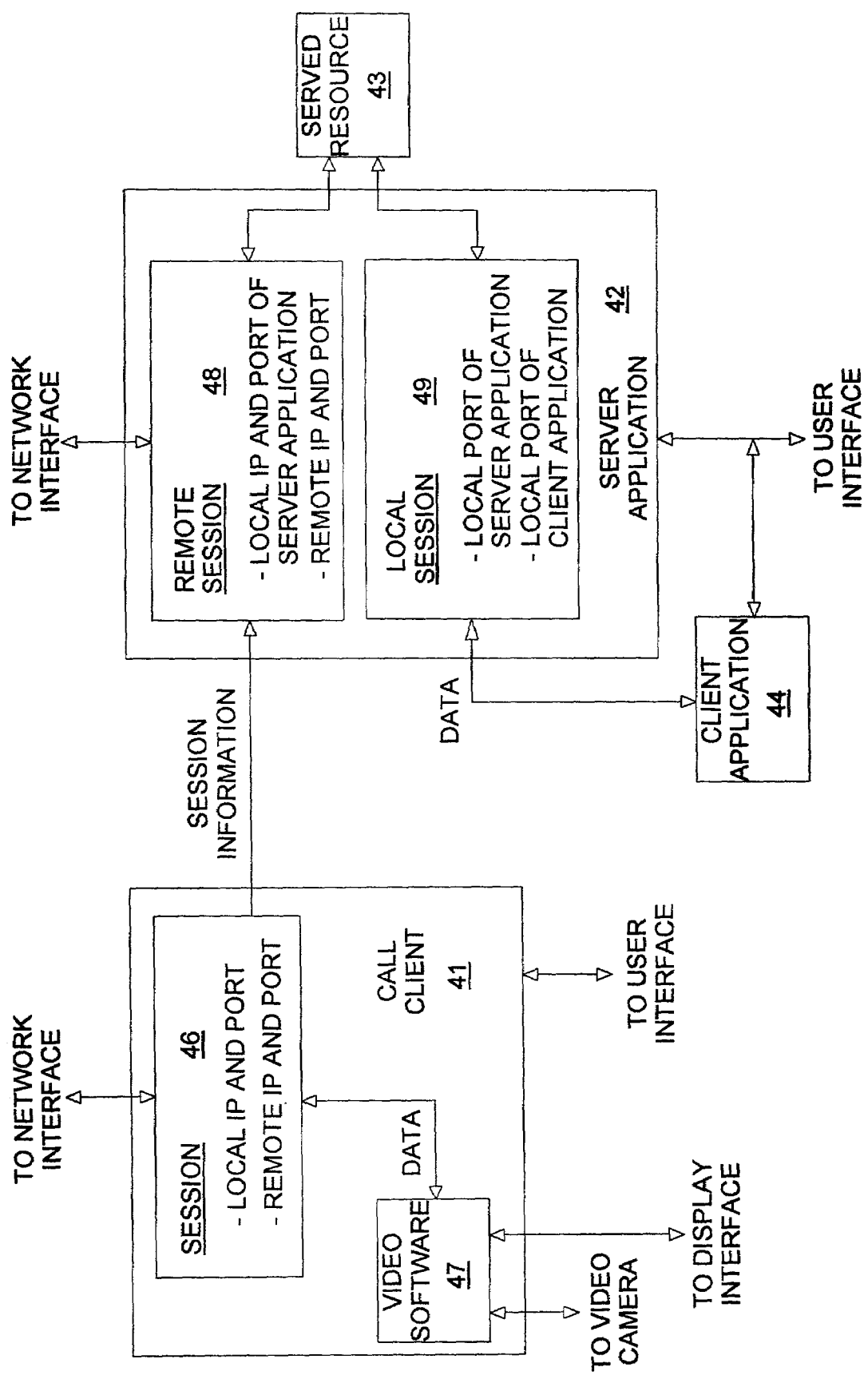
FIG. 7 is a block diagram showing the elements of the computer hosting the shared resources in greater detail.

FIG. 7 shows the operation of computer 10 for serving the shared resource between both computers in greater detail. In establishing the data call (e.g., a video telephony call), call client 41 creates a network session 46 between itself (as referenced within computer 10 by the local IP address of computer 10 and the port address used by call client 41) and, depending upon the connection mode, either central server 13 or remote computer 11 (as referenced within computer 10 by a remote IP address and port address which were provided by central server 13). Using conventional network protocols, data is exchanged between computers 10 and 11. In a preferred embodiment in which call client 41 establishes a video telephony call, the one-way or two-way video data is passed between session 46 and video software 47. Video software 47 processes video from a video camera and forwards it to session 46. Video software 47 also processes remote video data received from session 46 and feeds it to a display interface within the overall user interface.

A user command is generated within the user interface to request the sharing of computer resources other than that within the functionality of call client 41 (e.g., a user mouse clicks a program launcher for the desired resource). Server application 42 and client application 44 are launched if not already active. Client application 44 uses the data or other shared resource in the manner desired by the user, and server application 42 serves the shared data or other resource simultaneously to the local user and one or more remote users. Thus, server application 42 creates a remote session 48 for exchanging network packets with the remote user (e.g., via central server 13) and a local session 49 for communicating with client application 44.

Local session 49 utilizes the local port numbers of the two applications for communicating the data or other resource between served resource 43 and client application 44. Remote session 48 obtains remote session address and port information from session 46 in call client 41. For example, when creating remote session 48, server application 42 may issue a request via the operating system/user interface to call client 41 for the IP address and port address for the remote call client in the remote computer. Call client reports this session information to server application 42 which then establishes its remote session 48 in one of two ways. In a first method, a separate network session is created by sending an initiation message to remote computer 11. In the initiation message, server application 42 provides its distinct port address rather than the port address of call client 41. Thus, call client 41 and server application 42 can communicate with the remote user in parallel. In a second method, call client 41 either terminates or goes into hibernation and server application 42 takes over the existing network session. In other words, server application 42 assumes the port address used by call client 41 in the existing session and no new initiation message is sent.

Figure 8:
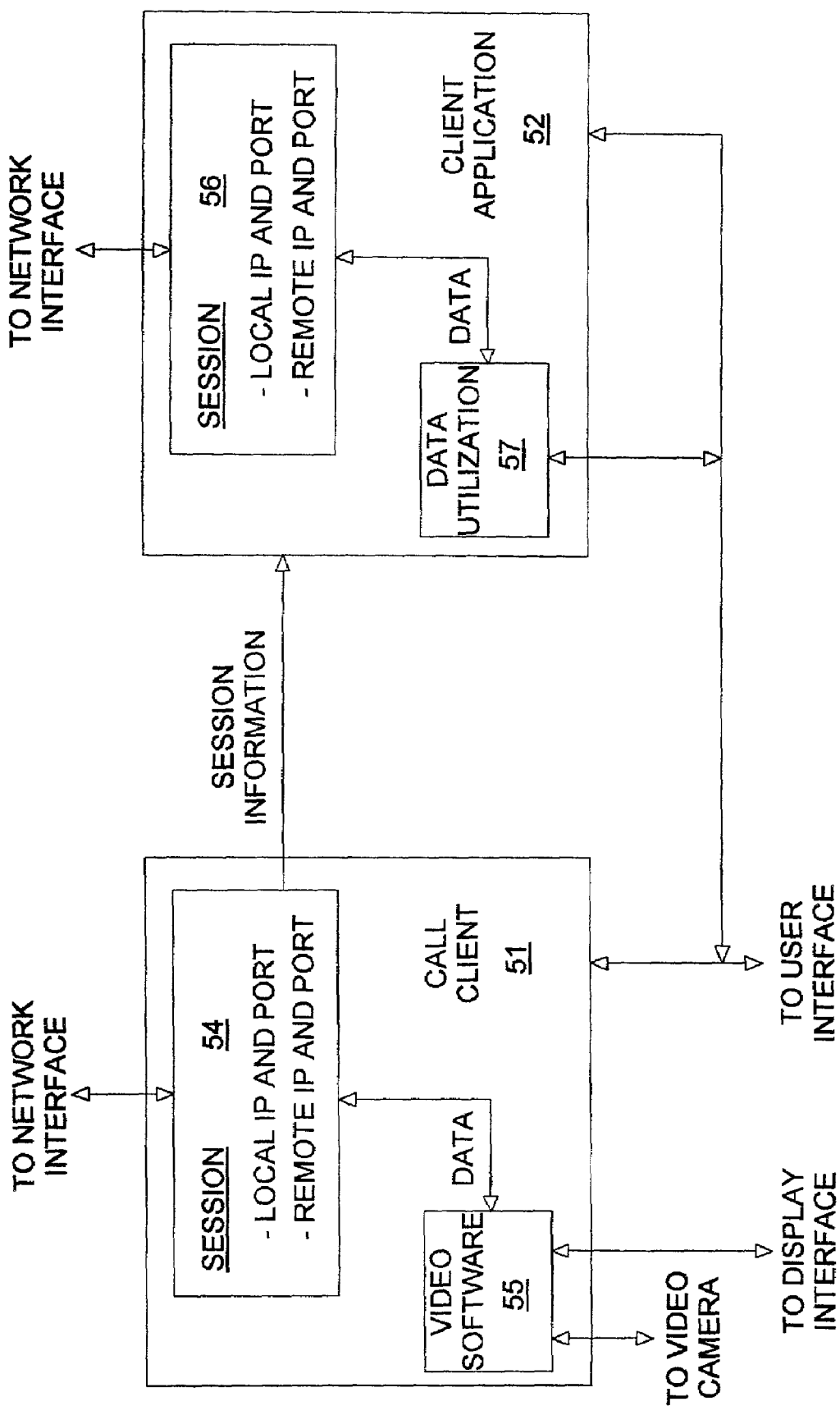
FIG. 8 is a block diagram showing the elements of the remote computer accessing the shared resources in greater detail.

FIG. 8 shows remote computer 11 where the shared resource does not reside. In response to the request for sharing the resource, client application 52 is launched if not already running. A session 56 obtains remote IP address and port address information of computer 10 and creates or accepts a network session as described above. Data utilization software 57 exchanges data with the remote server application via session 56.

Figure 9:
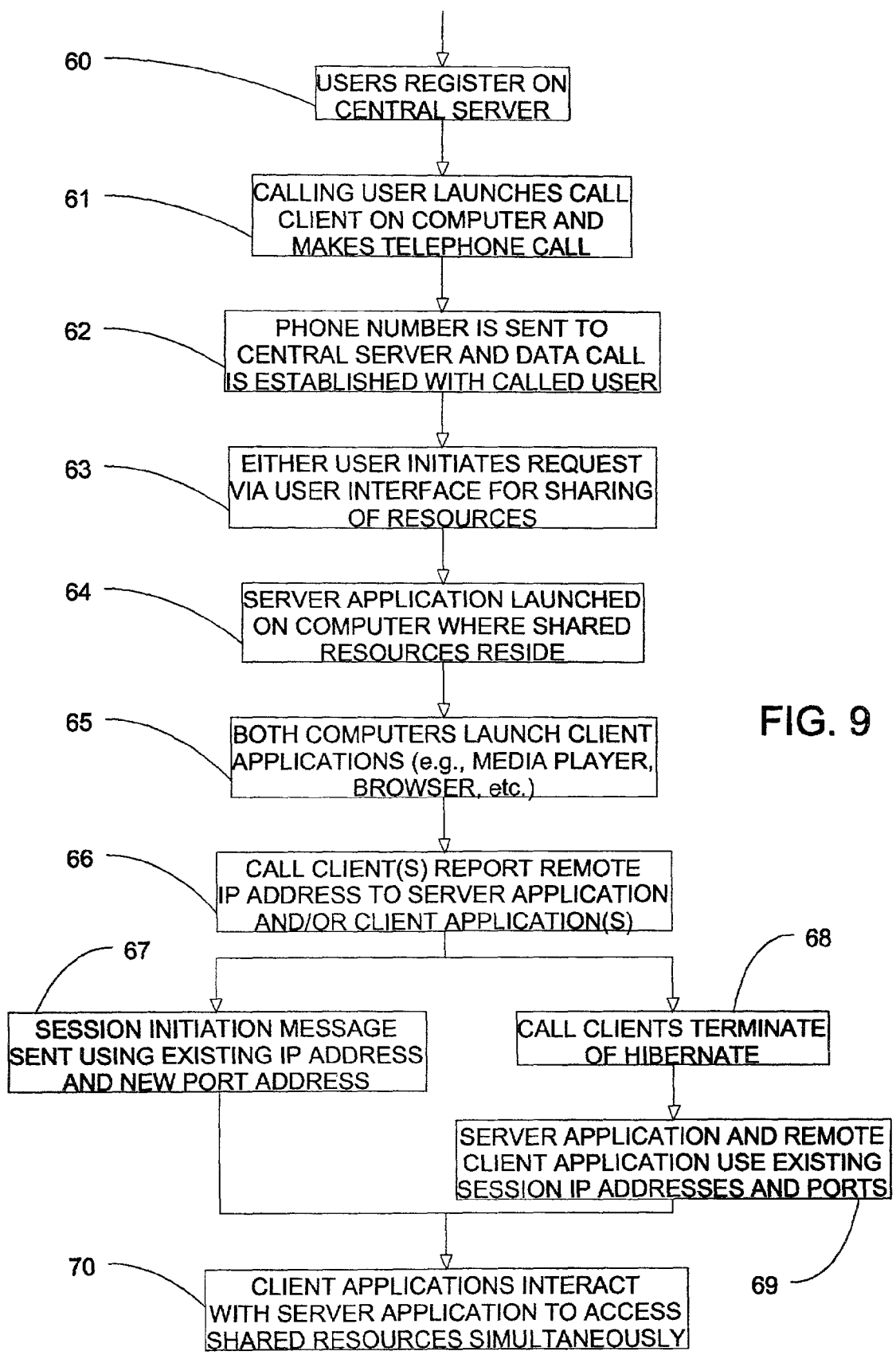
FIG. 9 is a flowchart showing preferred embodiments for establishing the private sharing of computer resources between network users.

The overall method of the present invention is shown in FIG. 9. In step 60, multiple users sign-on or register with the central server. A calling user launches their call client on their computer in step 61. Preferably, the calling user makes a telephone call to the called user, and the act of dialing the telephone number may send a signal to the computer for automatically launching the call client if it is not already running. Alternatively, no telephone call is necessary and the calling user may enter a telephone number or other identifying information of the called user into the call client. In step 62, the phone number or other identifying information is sent to the central server and a data call is established with the called user.

In step 63, either user initiates a request via their user interface for sharing of resources not accessible to the call clients. If the request is initiated by the user that is remote from the shared resources, then their call client forwards the request.

The server application is launched on the computer where the shared resources reside in step 64. In step 65, both computers launch appropriate client applications for accessing the served data from the server application, such as a media player or a browser.

In step 66, one or both call clients report IP addresses and port addresses of the other computers to the server application and/or the client application(s). For example, the remote IP address used in the call client of the computer where the shared resource resides is reported to the server application. Also, the remote IP address used in the call client of the computer not containing the shared resource is reported to the client application running in that computer.

Based on the reported IP addresses and ports, the network session between the server application and the client application of the remote computer follows either one of two methods as shown in FIG. 9. In step 67, a second session between the two computers is created by means of either the server application or the remote client application sending a session initiation message to the other using the existing IP address information but using a new port address for the origination application. A new port address for the other application can be identified in a response to the session initiation message. Alternatively, both call clients either terminate or hibernate in step 68. In step 69, the server application and the remote client application use the existing session's IP addresses and ports. In step 70, both client applications interact with the server application in order to access the shared resource simultaneously.

Figure 10:
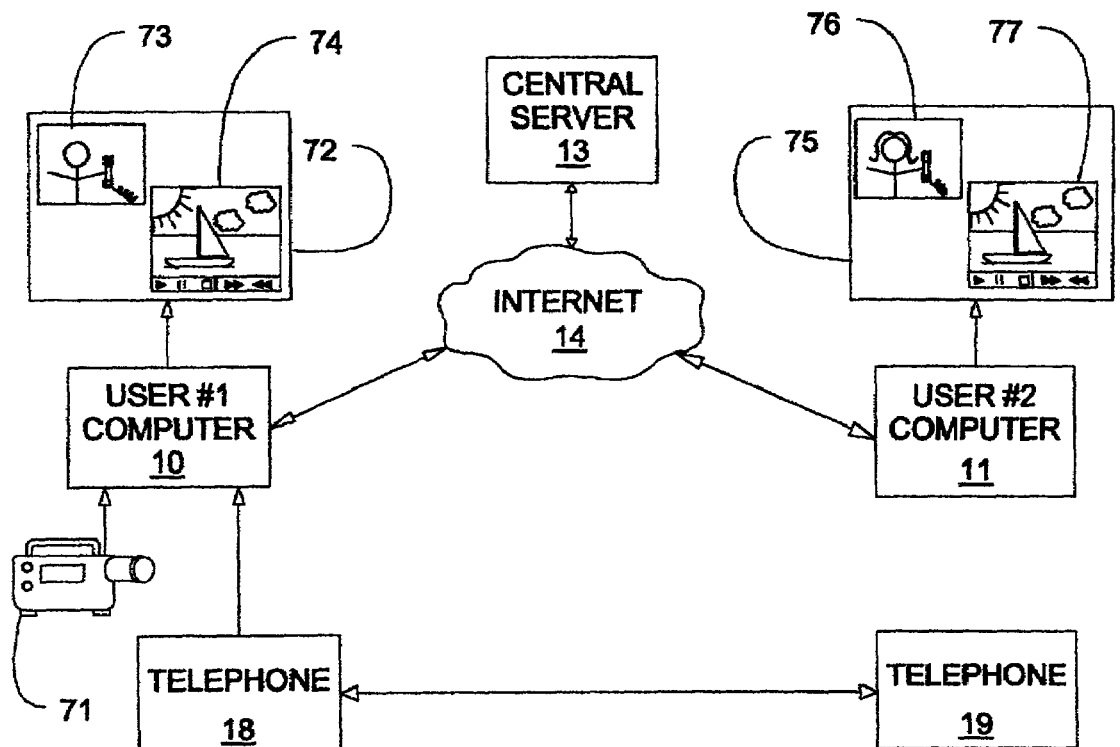
FIG. 10 is a block diagram showing the interconnection of a video camera to one computer for sharing prerecorded motion video with a remote computer.

The exchange of prerecorded motion video according to the present invention is shown generally in FIG. 10. Prerecorded motion video as used herein refers primarily to any digitized video clips (with or without accompanying audio) of a private nature to be shared between private individuals, such as video taping of family events. Such clips may typically be recorded onto tape, DVD, or solid state memory using a portable digital video recorder (i.e., a digital camcorder). A camcorder 71 having the desired motion video clip is connected by user #1 to computer 10 for transferring the clip thereto. Preferably, a firewire interface (i.e., IEEE standard 1394) is used for the transfer of uncompressed video and audio. Computer 10 preferably compresses the desired clip to facilitate transfer over Internet 14 to computer 11.

Computer 10 includes a display monitor 72 and computer 11 includes a display monitor 75. During a video telephony call, call windows 73 and 76 show live video received from the other endpoint of the video telephony data call. To share a compressed motion video clip, computer 10 launches a streaming video server and streams the clip simultaneously to media players launched in computers 10 and 11. Media player windows 74 and 77 on monitors 72 and 75, respectively, display the stream so that both users are seeing the same part of a clip at the same time. Due to bandwidth limitations of the network connection, it may be desirable to shutdown the video telephony portion of the data call, at least during streaming of the prerecorded motion video clip. The voice telephone call may preferably remain open, thereby allowing the users to discuss the clip as it is viewed. During streaming, the controls of both media players are preferably active so that viewing of the clip is jointly controlled (i.e., either user can stop, play, pause, rewind, or fast forward the clip by mouse clicking on the corresponding control buttons in media player windows 74 and 77). Alternatively, the media player controls may be set up so that only one user (e.g., the sending user) can control the viewing of the clip.

Figure 11:
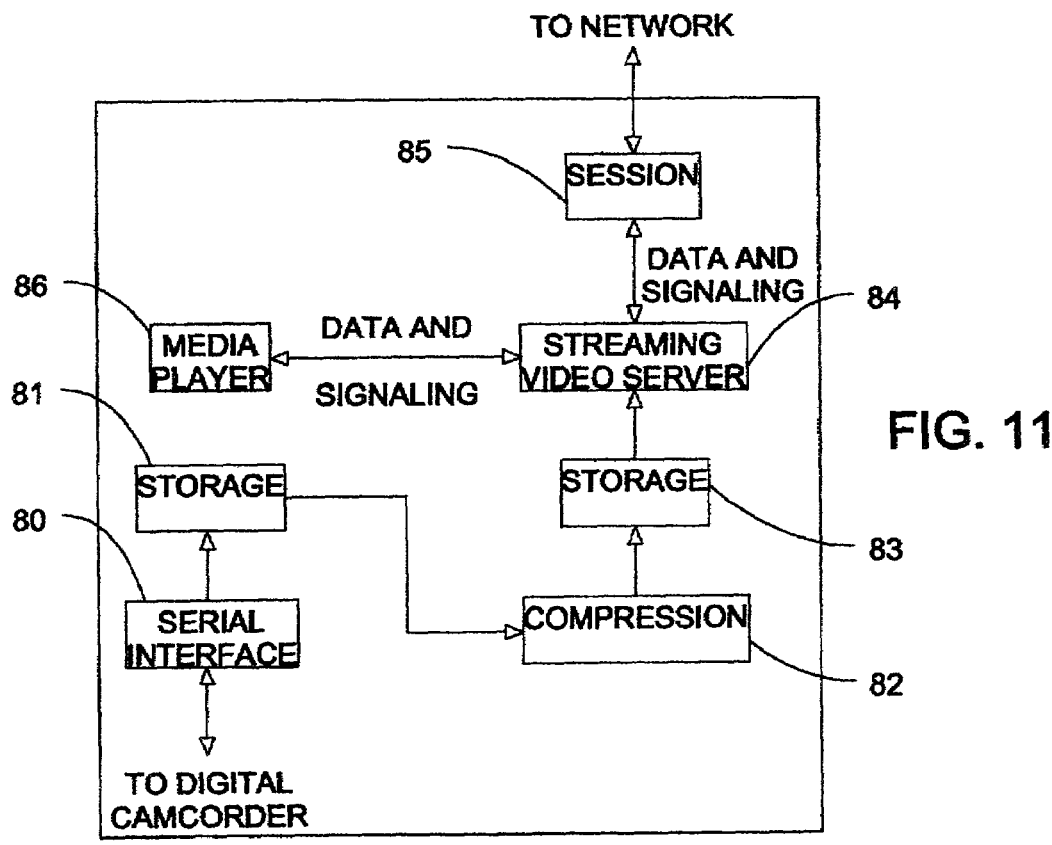
FIG. 11 is a block diagram showing software functional blocks within the resident computer.

As shown in FIG. 11, a motion video clip from a digital camcorder is received by a serial interface 80 (e.g., a firewire IEEE 1394 interface) and the clip is stored in storage 81 (e.g., a hard disk drive) in an uncompressed file format, such as DV. Alternatively, an analog video signal (e.g., from an analog camcorder) could be coupled to an analog-to-digital converter and stored in storage 81. Prior to sharing over the Internet, the stored clip is preferably compressed in a compression software block 82, and a compressed file is stored in storage 83. The compressed file format may be MPEG-2, for example.

Streaming video server application 84 accesses the compressed clip in storage 83 for streaming through a network session 85 to the remote computer via the Internet. It also locally streams the compressed clip to media player 86. The connections to session 85 and to media player 86 include both the streamed data and signaling, so that both media players can control playback of the clip.

Although compression block 82 is shown separate from video server 84, they may be integrated into a common software product.

Figure 12:
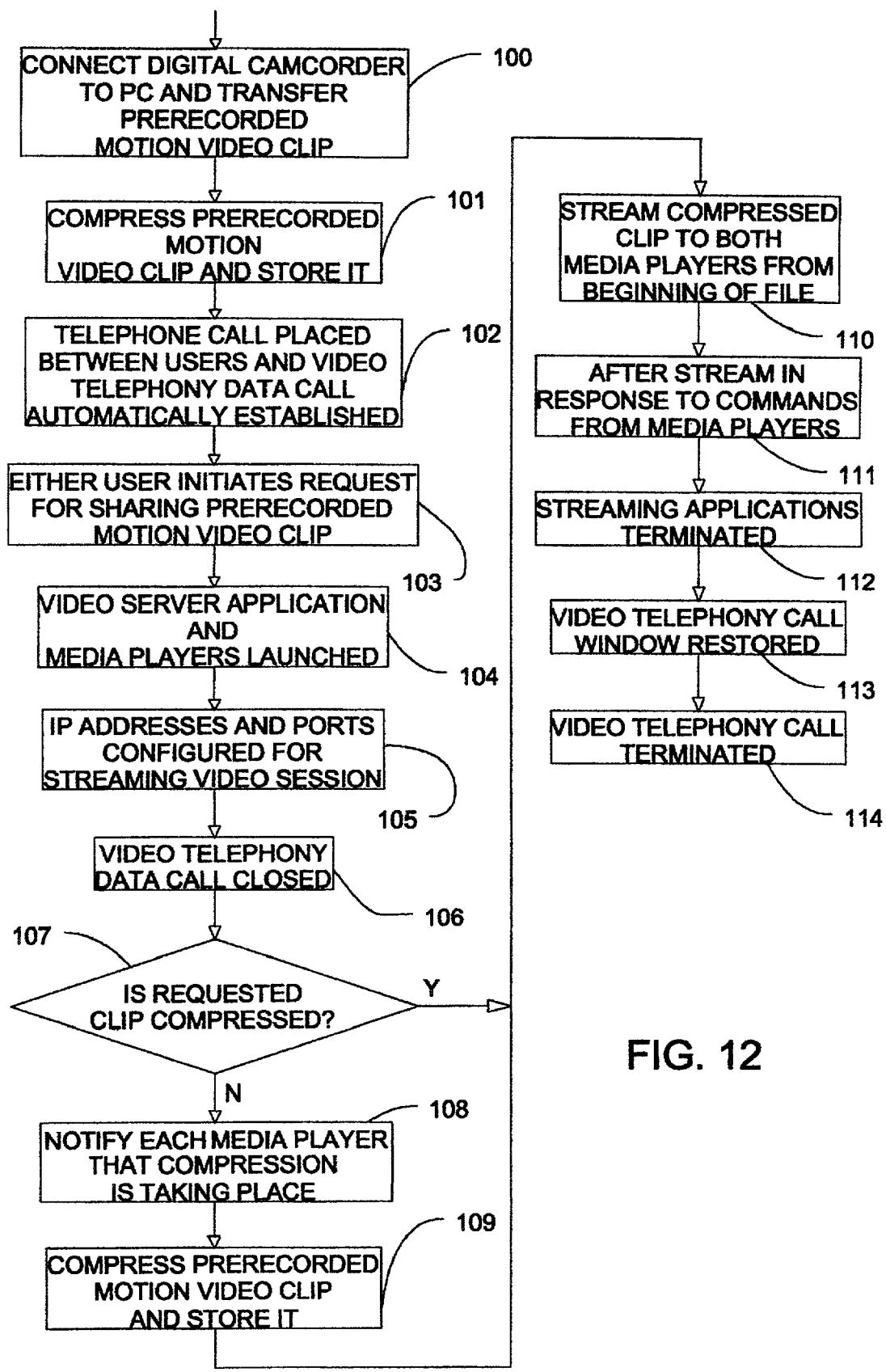
FIG. 12 is a flowchart showing a preferred embodiment for sharing prerecorded motion video.

FIG. 12 shows a preferred method of the present invention. In step 100, a video source such as a digital camcorder is connected to a computer and a prerecorded motion video clip is transferred. If the clip is being uploaded for the purpose of sharing over the Internet, then the user may optionally compress the clip at that time in step 101. If a clip is to be edited prior to sharing, then compressing the file would be deferred.

When a user desires to share a clip with a remote user, a telephone call is placed between the users and a video telephony data call is automatically established in step 102. During the video telephony call, either user initiates a request for sharing the prerecorded motion video clip in step 103. The request preferably includes the identification of the specific compressed file to be streamed.

In step 104, the streaming video server application and the media player applications are launched. In step 105, IP addresses and ports are configured for the streaming session between the streaming video server and the media players. As previously described, either a new session can be initiated or the existing session for the video telephony data call can be used. If the existing session is used, then the video telephony call must be halted or terminated as shown in step 106. Even if a new session is initiated, it may be desirable to terminate the video telephony call at least temporarily to provide sufficient bandwidth for transmission of the streaming video clip.

In step 107, a check is made to determine if the requested clip is already compressed. If it is not, then each user is notified in step 108 that compression is taking place (e.g., by displaying a text message within the media player windows). Then the clip is compressed and stored in step 109.

Using the compressed file, the prerecorded motion video clip is streamed to both media players from the beginning of the file in step 110. During streaming, the stream may be altered in step 111 in response to any commands from either of the media players. In step 112, the streaming applications (i.e., the streaming video server and the media players) are terminated or halted in response to reaching the end of the clip or in response to manual control action by either user, for example.

With streaming terminated or halted, the video telephony call can be restored within the call window in step 113. The video telephony call may be terminated in step 114 manually by a control action on either computer or by hanging up of the telephones for the voice call, for example.

While the present invention has been described with respect to two users sharing a particular video, the invention also contemplates that three or more users could simultaneously view a clip or participate in a video telephony call. In that case, the streaming video server would multicast to each of the remote computers, for example.

What is claimed is:

1. A method of privately sharing prerecorded motion video between first and second computers connected to an internetwork for exchanging network packets therebetween, wherein each of said computers has a respective private IP address within said internetwork, said method comprising the steps of:

maintaining a central server coupled to said internetwork and containing a database of IP addresses of registered computers;

running call clients in each of said first and second computers for establishing a data call between said first and second computers in response to said database of IP addresses;

uploading said prerecorded motion video into a video server application in said first computer, said video server application supporting streaming media;

generating within said first or second computer a request for sharing said prerecorded motion video;

running media player applications in said first and second computers, said media player applications supporting said streaming media;

streaming said uploaded motion video from said video server application to said media player applications simultaneously;

displaying said prerecorded motion video on said first and second computers; and said media players sending control messages to said video server application to jointly control replay of said uploaded motion video.

2. The method of claim 1 wherein said video server application compresses said prerecorded motion video prior to streaming and wherein said media player applications decompress said prerecorded motion video prior to displaying.

3. The method of claim 1 wherein said video server application and said media player application running in said second computer exchange network packets in response to said IP addresses used by said call clients.

4. The method of claim 1 wherein said call clients exchange live video signals between said first and second computers and wherein said call clients terminate operation during said streaming of said prerecorded motion video to said media player applications.

5. The method of claim 1 wherein said prerecorded motion video includes video data and audio data from a portable video camera.

6. The method of claim 1 further comprising the steps of:

originating a voice telephone call between users of said first and second computers in response to a target telephone number; and transmitting said target telephone number to said central server for determining one of said IP addresses.

7. A software product for privately sharing prerecorded motion video between a resident computer and a remote computer over a computer network, the software product comprising:

software configured to transmit information identifying said remote computer to a central server maintaining a database of IP addresses of registered computers, running a call client for establishing a data call between said resident computer and said remote computer in response to said database of IP addresses, generating a request for sharing said prerecorded motion video, running a streaming video server application in said resident computer for hosting said prerecorded motion video, running media player applications in said resident computer and said remote computer for receiving said streamed prerecorded motion video from said video server application simultaneously, and displaying said prerecorded motion video on said resident and remote computers, wherein said video server application and said media player application running in said remote computer exchange network packets in response to said IP addresses used by said call client, and wherein said software is further configured such that said media players send control messages to said video server application to jointly control replay of said uploaded motion video; and a storage system that stores said software product.

8. The software product of claim 7 wherein said software is further configured such that said video server application compresses said prerecorded motion video prior to streaming and wherein said media player applications decompress said prerecorded motion video prior to displaying.

9. The software product of claim 7 wherein said software is further configured such that said call clients exchange live video signals between said resident and remote computers and wherein said call clients terminate operation during said streaming of said prerecorded motion video to said media player applications.

* * * * *